United States Patent
Kehrer

(10) Patent No.: US 6,589,671 B1
(45) Date of Patent: Jul. 8, 2003

(54) METHOD FOR JOINING A CAST PART AND A CASE-HARDENED STEEL PART AND COMPONENT MANUFACTURED ACCORDING TO SAID METHOD

(75) Inventor: Oskar Kehrer, Graz (AT)

(73) Assignee: Steyr-Daimler-Puch Fahrzeugtechnik AG & Co. KG, Graz (AT)

( * ) Notice: Subject to any disclaimer, the term of this patent is extended or adjusted under 35 U.S.C. 154(b) by 0 days.

(21) Appl. No.: 09/700,154

(22) PCT Filed: May 12, 1999

(86) PCT No.: PCT/AT99/00117
§ 371 (c)(1),
(2), (4) Date: Apr. 24, 2001

(87) PCT Pub. No.: WO99/58287
PCT Pub. Date: Nov. 18, 1999

(30) Foreign Application Priority Data

May 12, 1998 (AT) .................................................. 807/98

(51) Int. Cl.⁷ .......................... B32B 15/01; B23K 31/02
(52) U.S. Cl. ............. 428/683; 219/121.11; 219/121.13; 219/121.14; 219/121.6; 219/121.63; 219/121.64; 219/121.65; 228/141.1; 228/165; 228/169; 228/174; 228/262.41; 428/544; 428/609

(58) Field of Search ................................. 428/683, 544, 428/609; 228/141.1, 165, 169, 174, 262.41; 219/121.11, 121.13, 121.14, 121.6, 121.63, 121.64, 121.65

(56) References Cited

U.S. PATENT DOCUMENTS 4,756,466 A    7/1988  Peck .......................... 228/165
5,628,449 A *  5/1997  Onuma et al. ......... 228/262.41

FOREIGN PATENT DOCUMENTS

DE    2 423 577        11/1974
EP    0 277 712         8/1988
WO    WO 88/04371       6/1988

* cited by examiner

*Primary Examiner*—Robert R. Koehler
(74) *Attorney, Agent, or Firm*—Bachman & LaPointe, P.C.

(57) ABSTRACT

A method for joining a first part to a second part wherein the first part comprises machine cast iron and the second part comprises case-hardened steel comprises abrading a surface on each of the parts which are to be welded together with a groove, fitting the abraded surfaces together to form a welding groove and high-energy beam welding within austenitic welding wire for joining the parts together.

13 Claims, 2 Drawing Sheets

METHOD FOR JOINING A CAST PART AND A CASE-HARDENED STEEL PART AND COMPONENT MANUFACTURED ACCORDING TO SAID METHOD

BACKGROUND OF THE INVENTION

The invention deals with a method for joining a cast part to a part made from case-hardened steel and with a component produced using this method.

In modern production engineering, it is highly desirable to join components comprising different parts which in some cases have already been fully machined and hardened, since an arrangement often has to satisfy different demands which cannot be achieved by a single material. It is then necessary to use different materials for individual elements of a component in order to optimize economic production and mechanical properties.

For example, in drive trains of motor vehicles, the problem often arises that a fully machined, hardened gearwheel has to be joined to a hollow housing part of complicated geometry, which by its nature is a casting. Gearwheels are usually case-hardened, and consequently their basic microstructure is blank-hardened, which means a high strength but very low toughness and elongation at break compared to normalized steel with a ferritic-pearlitic microstructure. The castings preferably consist of cast steel, white-heart malleable cast iron or nodular cast iron, and their carbon content is usually over 2 wt. %.

Parts of this type are usually joined by means of high-strength screws. However, screw connections of this type require sufficiently large flanges and therefore increase the weight of and space taken up by the component. In addition, the time involved in assembly and dismantling, particularly if, after a prolonged operating period, the connection has become impossible to unscrew, is considerable. Welding is ruled out on account of the fully machined state (distortion) and because both cast iron and case-hardened steel are difficult to weld. Moreover, it must be possible to produce the join reproducibly with absolute reliability and with high quality under the high dynamic loads.

EP 277 712 A has disclosed a valve plunger comprising two metal parts which have been welded together. One part consists of high-carbon or alloyed steel or of hardenable cast iron; the other part consists of low-carbon steel (carbon content 0.05 to 0.2 wt. %), the welding properties of which do not cause any problems. The two parts are joined together by means of a high-energy beam without prior weld seam preparation. There is therefore no space for a liquid welding zone. One part is decarburized at the contact surface. To form an austenitic welding zone, a nickel disk is inserted or one part or the other is nickel-plated on its welding surface.

A drawback of this solution is the decarburization required prior to the welding and the heat treatment required before and afterwards. Also, the surfaces which are to be welded and are in contact with one another fail to ensure uniform welding over the depth of the seam, since the high-energy beam is already releasing energy on its path along the surfaces, and consequently is only weak at the deeper points. Therefore, even in the simple case in which only one of the parts consists of a material which is difficult to weld, the actual problem is not solved: that of controlling the carbon and producing a join which is reliably free from cracking over the entire weld seam. However, the latter criterion is very important for the transmission of high forces.

SUMMARY OF THE INVENTION

Therefore, the object of the invention is to allow such components to be welded together in series production and suitably for the load and materials conditions. This is achieved by means of the method according to the invention, which consists in the surfaces which are to be joined on the otherwise fully machined parts being at least partially abraded in order to prepare for welding, so that a narrow U groove, Y groove or V groove is formed, and the parts then being fitted together and welded by means of a high-energy beam while an austenitic welding wire is being supplied.

The fact that the weld seam preparation as for a narrow U seam, Y seam or V seam or mixed forms of these seams, which is unusual for welding with a high-energy beam (e.g. a laser or electron beam), extends over a relatively large part of the surfaces which are to be welded creates a space in which much of the material of the welding wire supplied is incorporated in the alloy. By virtue of the highly focused high-energy beam, the walls of the space (the carburized surfaces of the parts which are to be joined) are fused over only a very small depth. Therefore, it is only possible for a small amount of carbon to be incorporated into the molten weld metal, especially since the small amount of carbon is distributed through the volume of the space. Consequently, the microstructure is largely maintained in the welding zone and on its two sides. An austenitic molten weld metal which is compatible with the two base materials is formed in the space from the welding wire supplied. As a result, a weld seam which has a high fatigue strength and is reliably free from cracks is formed with a high level of reproducibility despite batch-related fluctuations which occur in practice.

Since, in the case of high-energy beam, the amount of heat supplied with respect to the length of the weld seam is small, the heat-affected zone at the edge and the brittle zone formed as a result is so narrow that it does not have any significant effect on the elasticity of the overall join. The narrow weld groove (which is significantly narrower than in the case of a conventional arc-welded seam) offers the further advantages of, firstly, not impeding the penetration of the high-energy beam and, secondly, still being so close to the beam that its wall reaches but does not exceed the required welding temperature.

Therefore, the high-energy beam is used not only for its high energy concentration and therefore low heating of the workpiece, but also for a metallurgical purpose. The material of the base materials which are difficult to weld is therefore replaced by a filler material which is compatible with the two base materials.

In a preferred embodiment, it is possible to produce joins which can be subjected to particularly high loads. This embodiment consists in the welding groove which is produced during the weld seam preparation having a cross section which corresponds to the cross section of the finished weld seam, in particular is equidistant with respect thereto. As a result, the fused zone of the surfaces to be welded remains equally narrow over the entire depth, thus ensuring that the join is of high quality over the entire depth of the seam.

Tests have established that high dimensional accuracy of the join combined with optimum through-welding and therefore a maximum fatigue strength is achieved if the depth of the U groove or V groove is ⅔ or ⅞ of the beam penetration depth.

The welding wire may be made in such a way that, at the very high cooling rate which is involved in high-energy beam welding, it spontaneously forms an austenitic microstructure, although it may also be austenitic from the outset through the use of alloying elements. The welding wire advantageously contains, most preferably, at least 50 wt. % nickel. In this way, the formation of austenite is ensured irrespective of the cooling rate, and as it mixes with the two base materials the nickel forms a particularly reliable crack-free buffer zone between the joined parts.

In particularly difficult cases, it may be advantageous for the case-hardened layer to be at least partially abraded prior to the preparation of the weld seam, provided this takes place during the weld seam preparation itself. Such cases occur if a special case-hardened process is employed if the cross sections adjoining one another at the surfaces to be welded or the rigidity levels of the joined parts differ greatly.

In such cases, it is also advantageous if at least one of the two parts has a further groove with a round groove base running parallel to the weld seam. In welded joints between parts which have circular symmetry in a plane which is perpendicular to the axis, but particularly in the case of cylindrical welded surfaces, a local reduction in the cross section of this nature has the advantageous effect of compensating for differences in the shrinkage or shrinkage rate without, however, having a notch effect.

BRIEF DESCRIPTION OF THE DRAWINGS

The invention is described and explained below with reference to drawings, in which.

DETAILED DESCRIPTION

Figure 1:
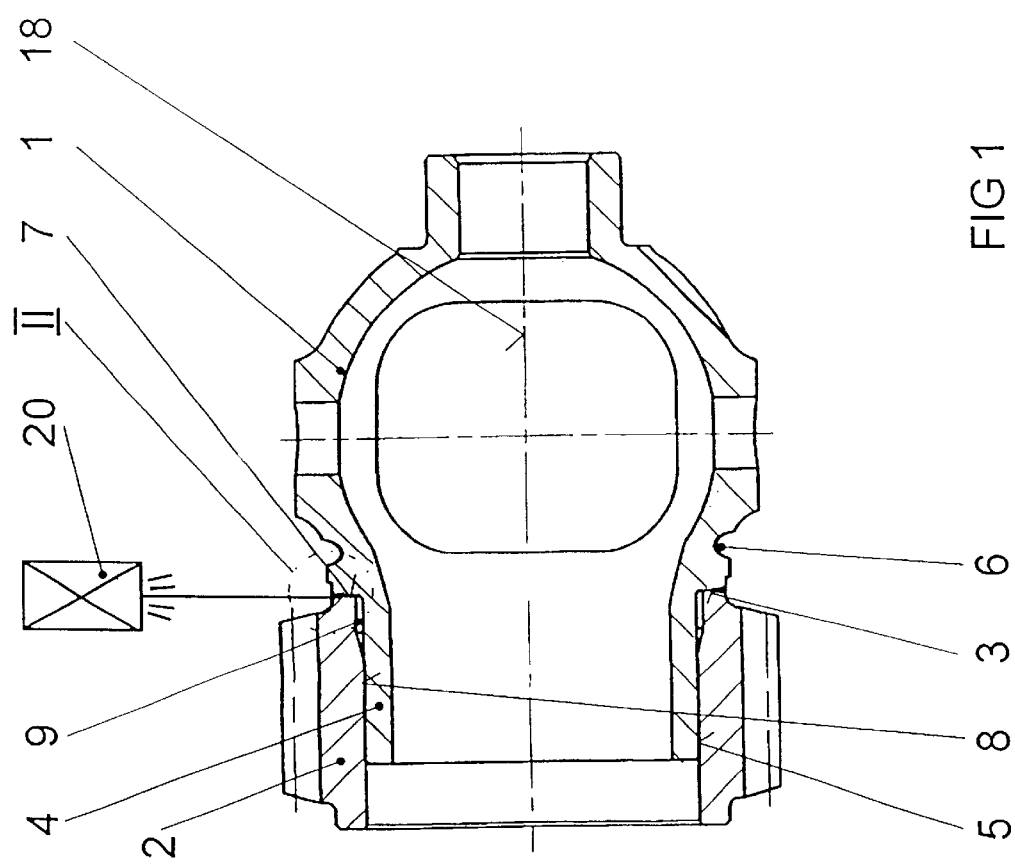
FIG. 1 shows a first exemplary embodiment of a component according to the invention.

In FIG. 1, the housing of a differential is denoted by 1 and a gearwheel which is joined to this housing to form a component is denoted by 2. The housing 1 consists of white-heart malleable cast iron, cast steel or nodular cast iron, e.g. GGG 40,50,60 or GTW-S38, the gearwheel 2 consists of steel and is case-hardened. The housing 1 has a first surface 3 which is perpendicular to the axis, is to be welded and is adjoined by a cylindrical collar 4 which forms an outer, cylindrical locating surface 5. At an area of relatively great wall thickness, the housing 1 can be provided with a circumferentail groove 6 which runs parallel to the first surface which is to be welded and is rounded in cross section. On the gearwheel 2 there is a second surface 7 which is to be welded and lies in a plane which is perpendicular to the axis, and a cylindrical locating surface 8 which rests on the cylindrical locating surface 5. At the transition to the second surface 7 which is to be welded, the cylindrical locating surface 8 may be set back so that a widened section 9 is formed. This facilitates production and makes it easier to push the gearwheel onto the collar 4 as well as, if necessary, improving the root fusion. The axis of rotation of the component is denoted by 18, and the welding head is denoted by 20.

Figure 2:
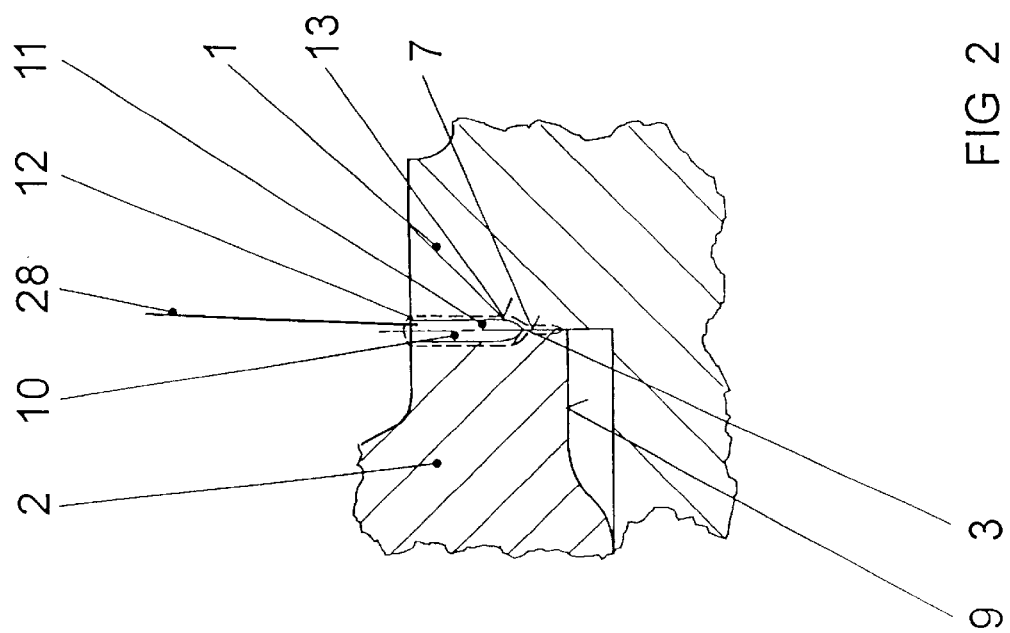
FIG. 2 shows an enlarged view of detail II from FIG. 1.

FIG. 2 shows the two parts fitted together and in the state in which they have been prepared for welding. It can be seen that the second surface 7 which is to be welded extends inwards only as far as the widened section 9. It has been abraded over a relatively large part, so that the first half 10 of a narrow groove is formed. The cross section of the groove may be in the shape of Y, U or V, or combinations thereof. The welding groove produced during the weld preparation ideally has a cross section which is equidistant with respect to the cross section of the finished weld seam. The first surface which is to be welded is machined in the same way. A rounded section or a broken edge 12 may be provided at the transition to the outer cylindrical surface. During welding by means of a high-energy beam (electron or laser beam), the material of an austenitic welding wire 28 is introduced into this narrow U groove 10, 11, so that a molten weld metal forms in the U groove.

On account of the highly focused beam and the high welding speed, the walls 10, 11 of the U groove are only fused over a slight depth, so that only a small amount of carbon from the two parts can be incorporated into the alloy, and a stable austenitic microstructure can form in the molten weld metal. In the vicinity of the walls, the molten weld metal forms a very narrow heat-affected zone of martensitic microstructure or bainitic microstructure on the steel side and martensitic, ledeburitic or bainitic microstructure on the casting side. The limits 13 of the welding zone are shown by dashed lines. The welding takes place in an inert or active shielding gas atmosphere. The welding wire 28 supplied contains a filler material which is compatible with the two base materials, preferably an austenitic material, for example having a nickel content of from 20 to 100 wt. % preferably at least 30 wt. % nickel.

Figure 3:
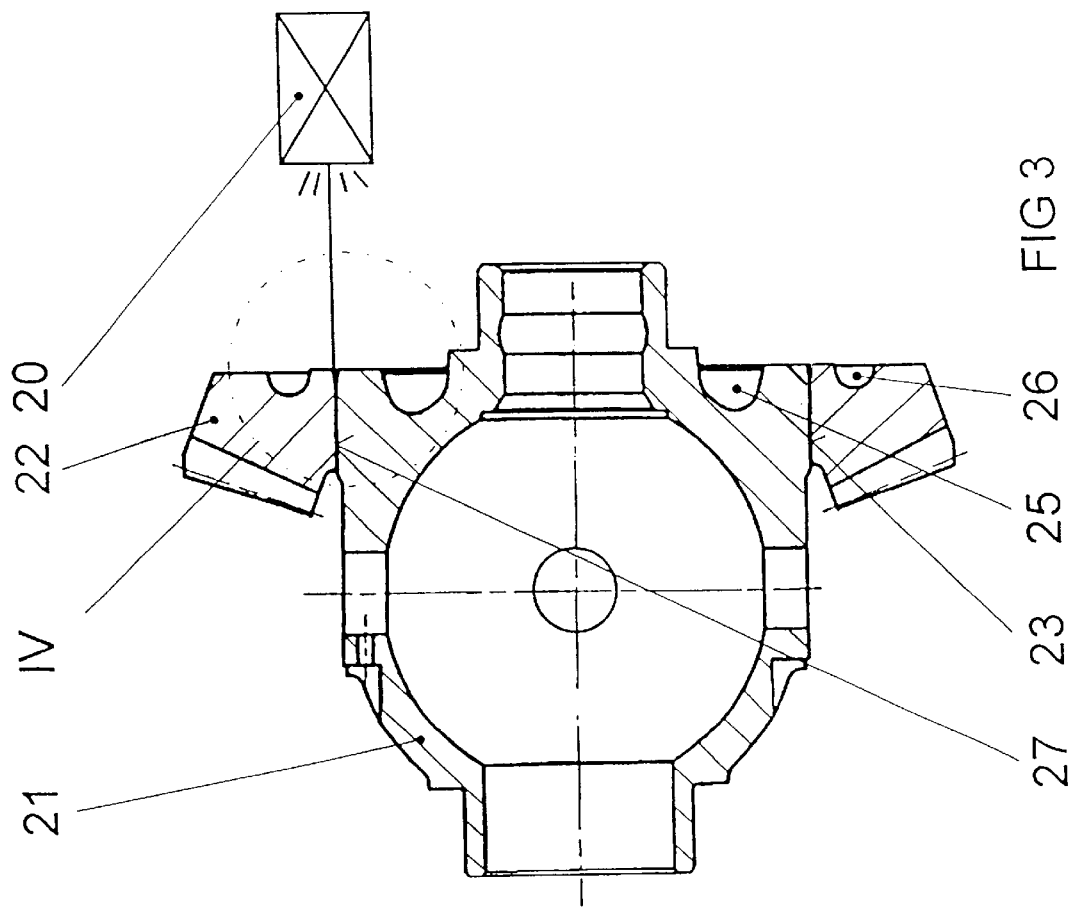
FIG. 3 shows a second exemplary embodiment of a component according to the invention.

FIG. 3 shows another component, which once again comprises a housing 21 and a gearwheel 22, in this case a ring gear. The combination of materials is substantially the same. The difference from the previous exemplary embodiment is that the two surfaces 23, 27 which are to be welded are cylindrical surfaces. 25 and 26 in turn denote round grooves which are to compensate for thermal expansions.

Figure 4:
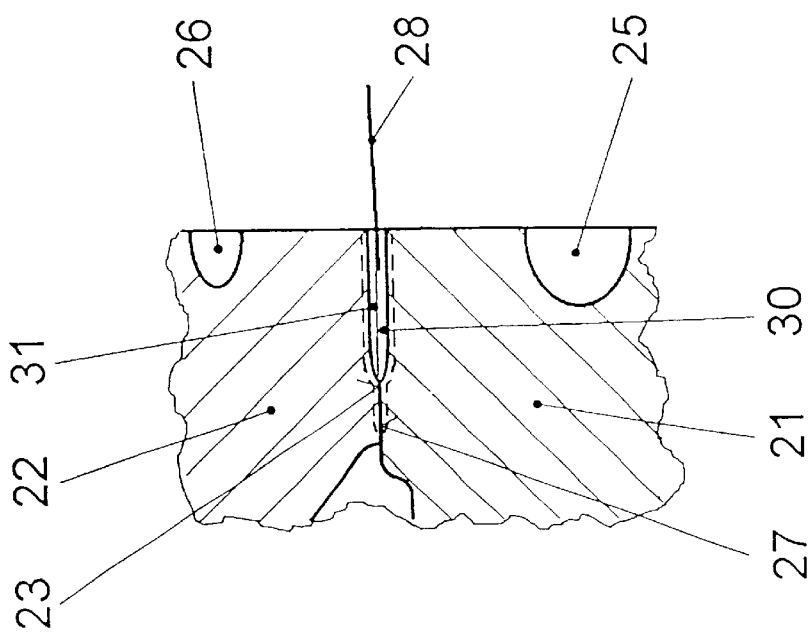
FIG. 4 shows an enlarged view of detail IV from FIG. 3.

FIG. 4 shows a detailed view of the prepared welding surfaces 23, 27, which both once again have the first and second half 30, 31 of a narrow U-shaped groove, having been abraded for the weld seam preparation, so that then only a relatively small part of the surfaces which are to be welded at the same time serves as a locating surface. The case-hardened layer may be abraded at the locating surface 23 of the ring gear 22, although this cannot be seen in the drawing.

What is claimed is:

1. A method of joining a first part and a second part comprising:

providing a first part comprising a machined cast iron part;

providing a second part comprising a machined case-hardened steel part;

at least partially abrading a surface on each of the first part and second part which are to be welded together with a groove;

fitting the surface of the first part together with the surface of the second part wherein the groove on each surface is opposed to each other to form a welding groove; and high-energy beam welding with an austenitic welding wire for joining the parts and forming a welding seam having a welding depth.

2. The method as claimed in claim 1, wherein the welding groove has a cross section which corresponds to the cross section of the finished weld seam and is equidistant with respect thereto.

3. The method as claimed in claim 1, wherein the depth of the groove is ⅔ to ⅞ of the welding depth.

4. The method as claimed in claim 1, wherein the austenitic welding wire contains at least 30 wt. % nickel.

5. A component comprising a part made from case-hardened steel which has been welded to a part made from cast steel, white-heart malleable cast iron or nodular cast iron, the welded surfaces being in the form of a ring which is produced as set forth in claim 1.

6. The component as claimed in claim 5, wherein one of the two parts has a further groove with a round groove base running parallel to the weld seam.

7. A component comprising a part made from case-hardened steel which has been welded to a part made from cast steel, white-heart malleable cast iron or nodular cast iron, the welded surfaces being in the form of a ring which is produced as set forth in claim 2.

8. The component as claimed in claim 7, wherein one of the two parts has a further groove with a round groove base running parallel to the weld seam.

9. A component comprising a part made from case-hardened steel which has been welded to a part made from cast steel, white-heart malleable cast iron or nodular cast iron, the welded surfaces being in the form of a ring which is produced as set forth in claim 3.

10. The components as claimed in claim 9, wherein one of the two parts has a further groove with a round groove base running parallel to the weld seam.

11. A component comprising a part made from case-hardened steel which has been welded to a part made from cast steel, white-heart malleable cast iron or nodular cast iron, the welded surfaces being in the form of a ring which is produced as set forth in claim 4.

12. The components as claimed in claim 11, wherein one of the two parts has a further groove with a round groove base running parallel to the weld seam.

13. A method for joining a cast part (1; 21) to a part (2; 22) made from case-hardened steel by welding, wherein a) on the otherwise fully machined parts (1, 2; 21, 22), the surfaces (3, 7; 23, 27) which are to be welded are at least partially abraded in order to prepare for the welding, so that a narrow U groove, Y groove or V groove (10, 11; 30, 31) is formed, b) the parts (1, 2; 21, 22) are then fitted together and welded by means of a high-energy beam while an austenitic welding wire (28) is being supplied.

\* \* \* \* \*